May 31, 1966 F. J. MERKEL 3,253,525
VARIABLE OPTICAL WEDGE
Filed Jan. 3, 1964 2 Sheets-Sheet 1

INVENTOR
FRED J. MERKEL
BY
ATTORNEY

May 31, 1966  F. J. MERKEL  3,253,525
VARIABLE OPTICAL WEDGE
Filed Jan. 3, 1964  2 Sheets-Sheet 2

INVENTOR
FRED J. MERKEL
BY
ATTORNEY

United States Patent Office 3,253,525
Patented May 31, 1966

3,253,525
VARIABLE OPTICAL WEDGE
Fred J. Merkel, Rockville, Md., assignor to General Precision, Inc., a corporation of Delaware
Filed Jan. 3, 1964, Ser. No. 335,508
1 Claim. (Cl. 95—12.5)

This invention relates to a novel variable optical wedge system, and more particularly to a new and improved variable optical wedge system which corrects the optical field regardless of the actual angle of the line of sight.

Heretofore when taking photographs, and particularly ground photographs, from an airborne vehicle or the like, it has become necessary to mount the camera on a stable platform or the like.

A serious disadvantage of this method is that stable platforms are generally elaborate, expensive and weighty equipment. Even with the stable platforms it has become difficult and sometimes impossible to maintain the camera pointed directly at the nadir, or maintain the line of sight pointed from the camera directly at the object being photographed. The present invention contemplates the correction of this line of sight by the use of a variable optical wedge.

The present invention employs the theory of refracting an optical field by a prism and applies this theory to stabilize a nadir within an optical field, regardless of movement by pitching or rolling.

Briefly described, this is accomplished by a pair of optical lenses wherein one has a plano-convex configuration and the other has a plano-concave configuration. The concave and the convex surfaces of the two lenses are matched, and one is separated slightly from the other. Preferably, the concave and convex portions are partial spheres which will make them capable of being moved omni-directionally relative to each other and still maintain the same separation between them. If the plano-surface of the plano-convex lens is always maintained parallel to a given surface, such, for example, the surface of the earth, upon any movement in any direction of the plano-concave lens, image viewed from the focal point of the plano-concave lens will be continuously corrected.

In the accompanying drawing illustrating one embodiment of this invention wherein like references indicate like or corresponding parts throughout the several views, FIGURE 1 is a side view of a pair of optical lenses forming the present invention;

In the drawings there is shown for the purpose of illustration, one preferred embodiment of this invention wherein in like referenced numerals indicate like or corresponding parts throughout the several views.

Figure 1:
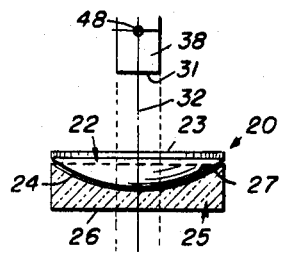

Basically, this invention employs a pair of lenses 20 wherein one lens 22 has a plano-surface 23 and a convex surface 24 and the other lens 25 has a plano-surface 26 and a concave surface 27. In each case the plano-surface is opposite the concave or convex surfaces, whichever the case may be. Each lens configuration is well known in the optical art and requires no specific description here for a complete understanding of this invention.

Figure 2:
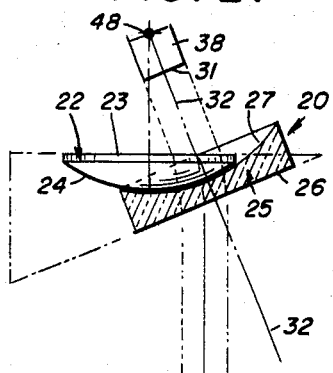
FIGURE 2 is a side view of a pair of optical lenses forming the present invention with a right pitch of the plano-concave lens with respect to the plano-convex lens.
Figure 3:
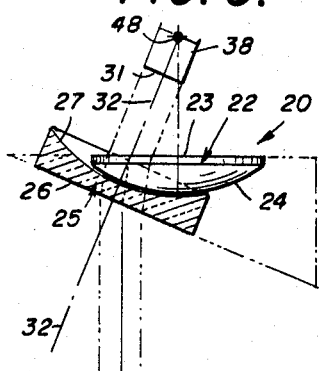
FIGURE 3 is a side view of a pair of optical lenses forming the present invention with a left pitch on a plano-concave lens with respect to the plano-convex lens.
Figure 4:
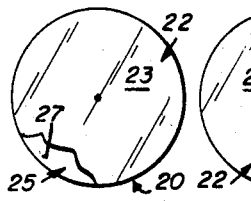
FIGURE 4 is a top view of FIGURE 1.
Figure 5:
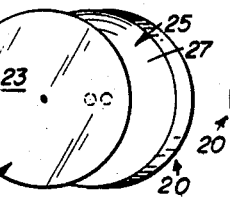
FIGURE 5 is a top view of FIGURE 2, illustrating the right pitch of the plano-concave lens.
Figure 6:
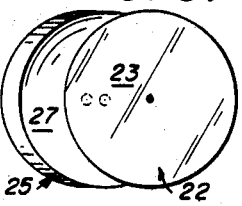
FIGURE 6 is a top view of FIGURE 3, illustrating the left pitch on the plano-concave lens.

In the present invention the convex surface 24 of the lens 22 matches or mates in close, but spaced, proximity to the concave surface 27 of the lens 25. The convex surface 24 has the same radius as the concave surface 27. The concave surface 27 and the convex surface 24 are separated slightly, as shown in FIGURES 1, 2 and 3, to prevent any abrasion, but the distance between the two surfaces is kept to a minimum thereby keeping deviation to a minimum. For all practical purposes, if this is done, the deviation is negligible and can be ignored in practicing this invention.

Referring generally to FIGURES 1 through 6, an object 29 is illustrated as lying on the surface of the earth directly below a sighting instrument or a camera 38 and directly below the plano-surface 26 of the lens 25. When the plano-surface 26 is parallel with the plano-surface 23, as shown in FIGURE 1, the lenses 22 and 25 will function as one piece of rectangular glass and the function of the lenses will cancel out as the incident pencils of light rays 33 from the object 29 will pass through the lenses 22 and 25 at right angles to both plano-surfaces 23 and 26.

If the plano-concave lens 25 is tilted and the plano-convex lens 22 remains stationary with its plano-surface normal to the earth's line of gravity when used in connection with a camera 38 as shown in FIGURE 2, the plano-surface 23 and the plano-surface 26 are no longer parallel and an optical wedge is formed. The image 31 and the line of sight 32 of the camera 38 will be tilted along with the plano-surface 26 of lens 25 because the line of sight 32 is normal to the plano-surface 26. The incident pencils of light rays 33 energizing from the surface of the object 29 will be refracted as they pass through the optical wedge formed by the lenses 20, as shown in FIGURE 2. At this instant the center of the pencils 33 will become coincident with the optical line of sight 32 of the camera 38. When the vehicle 34 is tilted in the opposite direction, the pencils of light 33 will refract in the reverse direction, as shown in FIGURE 3. Obviously, when the lenses 20 are ground to form a portion of a sphere there will be a comparable refracting of the pencils 33 over a 360 degree range.

Figure 7:
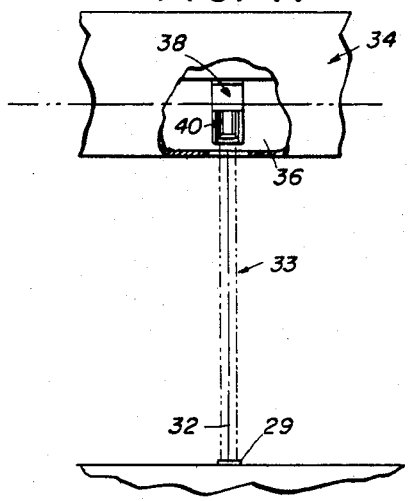
FIGURE 7 is a view illustrating a vehicle with a sighting device which employs this invention and shows the optical field from the camera to the earth when the camera is pointed straight down.

Referring more particularly to FIGURE 7, a vehicle 34, such as an aircraft, is illustrated with a cutaway section 36 provided to reveal a camera or sighting instrument 38, which is rigidly mounted to the airborne vehicle 34. It is to be understood that an aircraft with an aerial camera is illustrated only herein to explain the manner in which this invention can be used. The camera 38 of the conventional type with a lens system 40 has its line of sight 32 arranged as illustrated in FIGURES 1, 2, 3, 7 and 8. The plano concave lens 25 is rigidly mounted in a frame 45 and camera 38 is also mounted on the same frame 45. The frame 45 and the camera 38 are mounted upon the vehicle 34 directly, or may, if desired, be mounted upon a stable platform, as desired. The plano-concave lens 25 is mounted to the plano-convex lens 22 by a gimbal system illustrated by the numeral 42. The plano-convex lens 22 is suspended from the inner gimbal of the gimbals 42 by frame 43. Cutaway portion 46 is provided to allow the gimbal 42 to rotate about its center 48. The frame 43 is always gimballed about the center of the radii of the lenses 22 and 25.

Figure 8:
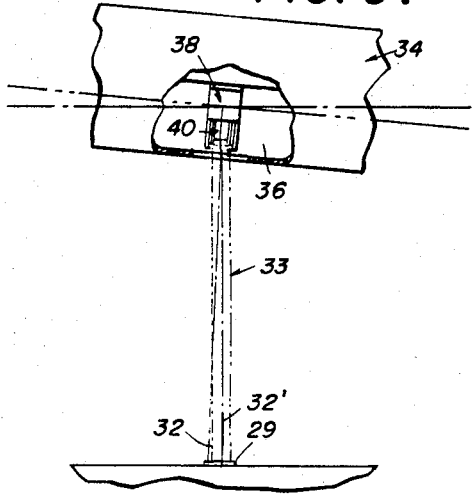
FIGURE 8 is a sectional view illustrating how the pencils of light rays from an object are corrected when the camera is tilted.
Figure 9:
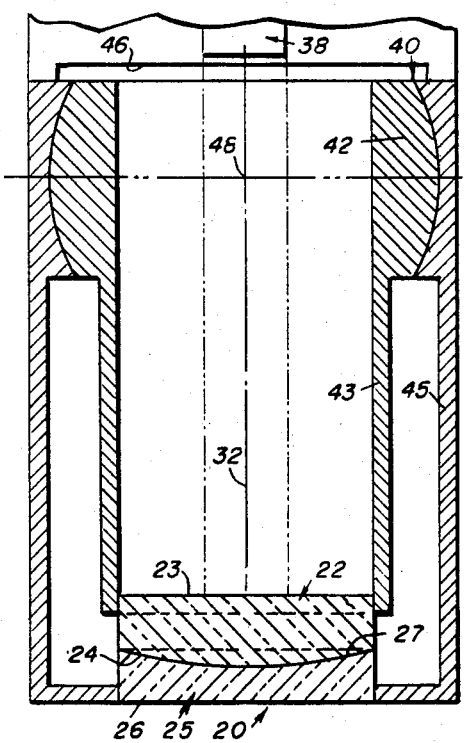
FIGURE 9 shows a view of embodying this invention mounted on the camera illustrated in FIGURE 7.
Figure 10:
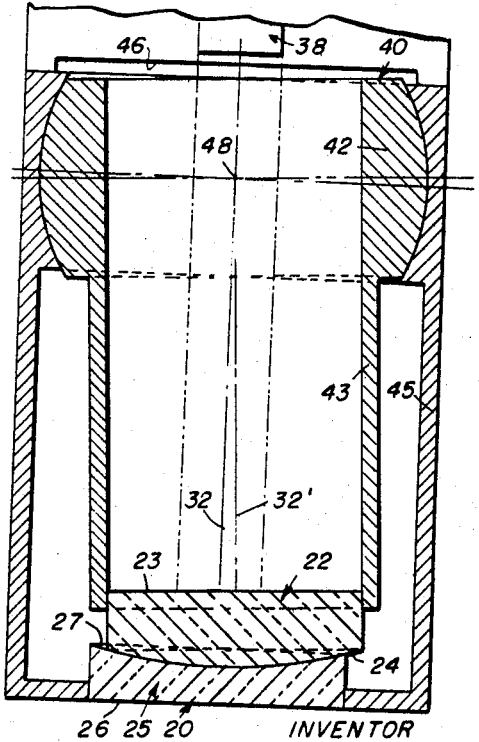
FIGURE 10 is a sectional view showing the relative change of position of the optical lenses shown in FIGURE 9, when there is a pitch on the airborne vehicle and the camera.

Referring now to FIGURE 8, the vehicle 34 is illustrated with a slight pitch or roll. When this happens the line of sight 32 is tilted away from the object 29 but because of the compensation by the gimballed plano-convex lens 22, the plano-surface 23 remains normal to the earth's gravity and the pencil rays 33 from the object 29 are refracted to be parallel with the line of sight 32.

No matter which direction the pitch or roll of the airborne vehicle 34 assumes, the concave-convex lens system 20, as contemplated by this invention, will assume the corrected wedge angle to any degree, which is only limited by the size of lens and the equipment used.

It is here recognized that there will be a slight parallax error injected into this device, but it will never be more than the radius of the lenses 22 and 25. It is also appreciated that errors due to the index of refraction of the specific material used in the lenses 22 and 25 may become apparent above angles of about 5 degrees. However, for all practical purposes these errors will be of such a small relative insignificance, they can be ignored.

Those skilled in the art will realize that to assume an absolute correction of the line of sight 32 it would be necessary for the embodiment of the invention described to compensate or displace lens 22 as a function of the index of refraction of the particular glass used.

Various modifications are contemplated and may obviously be resorted to by those skilled in the art without departing from the scope of this invention, as hereinafter defined by the appended claim, as only a preferred embodiment thereof has been disclosed.

What is claimed is:

An omni-directional optical lens system for stabilization of the observed nadir from an aircraft comprising:
  a support member adapted to be mounted on said aircraft,
  a spherical plano-convex lens rigidly mounted on said support members having the plano surface nearest said ground sighting means,
  a spherical plano-concave lens disposed to mate with and contiguous to but spaced from said convex lens for omni-directional movement in respect thereto, the radii of said convex and said concave surfaces of said lenses being equal,
  an optical ground sighting means mounted on said support member positioned within the optical field of said plano-convex lens, and
  gimbaling means coupled to said convex lens and mounted on said support, said means being gimballed about the center of the radii of said convex and concave lenses.

References Cited by the Examiner
UNITED STATES PATENTS 1,679,354　8/1928　Fairchild _____ 95—12.5
2,959,088　11/1960　Rantsch _____ 88—1

JOHN M. HORAN, *Primary Examiner.*